United States Patent [19]

Cawley et al.

[11] Patent Number: 5,175,807

[45] Date of Patent: Dec. 29, 1992

[54] VIDEO SIGNAL PROCESSING WITH ADDED PROBABILISTIC DITHER

[75] Inventors: Robin A. Cawley; Neil R. Hinson; Robert Long; Alan L. Stapleton, all of Berkshire, United Kingdom

[73] Assignee: Quantel Limited, Newbury, United Kingdom

[21] Appl. No.: 715,308

[22] Filed: Jun. 7, 1991

Related U.S. Application Data

[63] Continuation of Ser. No. 118,790, Nov. 9, 1987, abandoned.

[30] Foreign Application Priority Data

Dec. 4, 1986 [GB] United Kingdom ............... 8629084
Feb. 5, 1987 [GB] United Kingdom ............... 8702538

[51] Int. Cl.⁵ .................................................. H04N 9/00
[52] U.S. Cl. .................................... 395/128; 395/131; 358/29
[58] Field of Search ............... 364/521, 522, 518; 340/702, 720, 723, 726, 729, 728, 730; 358/75, 80, 29, 64, 163, 316, 318, 334, 10, 13, 17; 395/109, 128, 131

[56] References Cited

U.S. PATENT DOCUMENTS

| | | | |
|---|---|---|---|
| 3,681,650 | 8/1972 | Koll | 315/30 |
| 3,739,082 | 6/1973 | Lippel | 178/6 |
| 4,032,978 | 6/1977 | Wong | 358/283 |
| 4,184,206 | 1/1980 | Harano | 364/515 |
| 4,245,258 | 1/1981 | Holladay | 358/283 |
| 4,258,393 | 3/1981 | Ejiri et al. | 358/283 |
| 4,275,411 | 6/1981 | Lippel | 358/13 |
| 4,279,035 | 7/1981 | Skerlos | 455/158 |
| 4,308,326 | 12/1981 | Wirth | 430/6 |
| 4,340,912 | 7/1982 | Troxel | 358/283 |
| 4,393,399 | 7/1983 | Gast et al. | 358/80 |
| 4,394,662 | 7/1983 | Yoshida et al. | 346/33 R |
| 4,412,256 | 10/1983 | Heinzl et al. | 358/283 |
| 4,447,803 | 5/1984 | Crosby et al. | 340/347 |
| 4,449,150 | 5/1984 | Kato | 358/283 |
| 4,450,485 | 5/1984 | Oshikoshi et al. | 358/298 |
| 4,460,924 | 7/1984 | Lippel | 358/310 |
| 4,475,127 | 10/1984 | Iinuma | 358/260 |
| 4,476,497 | 10/1984 | Oshikoshi et al. | 358/298 |
| 4,485,408 | 11/1984 | Kamizyo et al. | 358/283 |
| 4,491,875 | 1/1985 | Kawamura | 358/298 |
| 4,495,522 | 1/1985 | Matsunawa et al. | 358/280 |
| 4,504,115 | 3/1985 | Ogawa et al. | 358/260 |
| 4,517,605 | 5/1985 | Yokomizo | 358/280 |
| 4,517,606 | 5/1985 | Yokomizo et al. | 358/280 |
| 4,524,447 | 6/1985 | Willis et al. | 358/23 X |
| 4,528,584 | 7/1985 | Sabri | 358/12 |
| 4,533,928 | 8/1985 | Sugiura et al. | 358/78 X |
| 4,549,220 | 10/1985 | Suzuki | 358/283 |
| 4,566,028 | 1/1986 | Lewis, Jr. et al. | 358/21 R |
| 4,568,966 | 2/1986 | Lippel | 358/13 |
| 4,578,714 | 3/1986 | Suguira et al. | 358/283 |
| 4,578,715 | 3/1986 | Yamaguchi | 358/283 |
| 4,594,726 | 7/1986 | Willis | 375/26 |
| 4,622,595 | 11/1986 | Hisatake et al. | 358/296 |
| 4,626,901 | 12/1986 | Tanioka | 358/75 |
| 4,633,416 | 12/1986 | Walker | 340/710 X |
| 4,638,373 | 1/1987 | Logan | 358/298 |
| 4,651,287 | 3/1987 | Tsao | 364/519 |
| 4,651,293 | 3/1987 | Kato | 364/602 |
| 4,652,905 | 3/1987 | Lippel | 358/13 |
| 4,654,695 | 3/1987 | Fling | 358/11 |
| 4,654,721 | 3/1987 | Goetzel et al. | 358/283 |
| 4,663,662 | 5/1987 | Sekizawa et al. | 358/75 |
| 4,667,251 | 5/1987 | Hasegawa | 358/283 |
| 4,673,971 | 6/1987 | Ikuta et al. | 358/75 |
| 4,674,861 | 6/1987 | Kawamura | 355/4 |
| 4,677,465 | 6/1987 | Alkofer | 358/80 |
| 4,679,073 | 7/1987 | Hayashi | 358/80 |
| 4,682,216 | 7/1987 | Sasaki et al. | 358/79 |
| 4,698,690 | 10/1987 | Tanioka | 358/283 |
| 4,700,235 | 10/1987 | Gall | 358/283 |
| 4,706,077 | 11/1987 | Roberts et al. | 340/728 |
| 4,707,742 | 11/1987 | Field et al. | 358/183 |
| 4,709,274 | 11/1987 | Tanioka | 358/283 |
| 4,729,035 | 3/1988 | Tanioka | 358/282 |
| 4,730,185 | 3/1988 | Springer et al. | 340/701 |
| 4,734,784 | 3/1988 | Tanaka | 358/283 |
| 4,734,786 | 3/1988 | Minakawa et al. | 358/287 |
| 4,736,254 | 4/1988 | Kotera et al. | 358/283 |

FOREIGN PATENT DOCUMENTS

| | | |
|---|---|---|
| 1269093 | 3/1972 | United Kingdom . |
| 1570773 | 7/1980 | United Kingdom . |
| 2121645 | 12/1983 | United Kingdom . |
| 2141895 | 1/1985 | United Kingdom . |

Primary Examiner—A. Jonathan Wysocki

*Attorney, Agent, or Firm*—Cooper & Dunham

[57] ABSTRACT

A system in which a characteristic of individual picture points is provided to an accuracy of m binary bits but conveyed by n bits, where n is less than m. The value of a lower order bit of the n bit signal is switched to cause said binary value to represent, for any one picture point, either a value above or a value below the original value. The new values are distributed without order among the picture points with a probability dependent upon the value of the (m−n) lowest order bits of the desired value.

25 Claims, 5 Drawing Sheets

Fig. 4.
|  | NO DITHER | MSB | LSB |
|---|---|---|---|
| ROW 1 | ⊘⊘⊘⊘⊘⊘⊘⊘⊘⊘⊘⊘⊘⊘⊘⊘ | 1 | 0 |
| ROW 2 | ○○○○○○○○○○○○○○○○ | 0 | 191/256 |
| ROW 3 | ○○○○○○○○○○○○○○○○ | 0 | 127/256 |
Fig. 5.
|  | WITH DITHER | MSB | LSB |
|---|---|---|---|
| ROW 1 | ⊘⊘⊘⊘⊘⊘⊘⊘⊘⊘⊘⊘⊘⊘⊘⊘ | 1 | 0 |
| ROW 2 | ⊘○⊘⊘○⊘○⊘⊘⊘⊘○⊘⊘⊘○ | 0 | 191/256 |
| ROW 3 | ⊘⊘○○⊘⊘○○○⊘○○⊘○⊘⊘ | 0 | 127/256 |
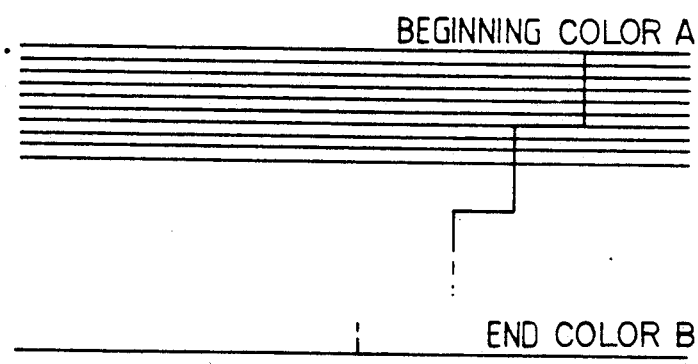
Fig. 6a.
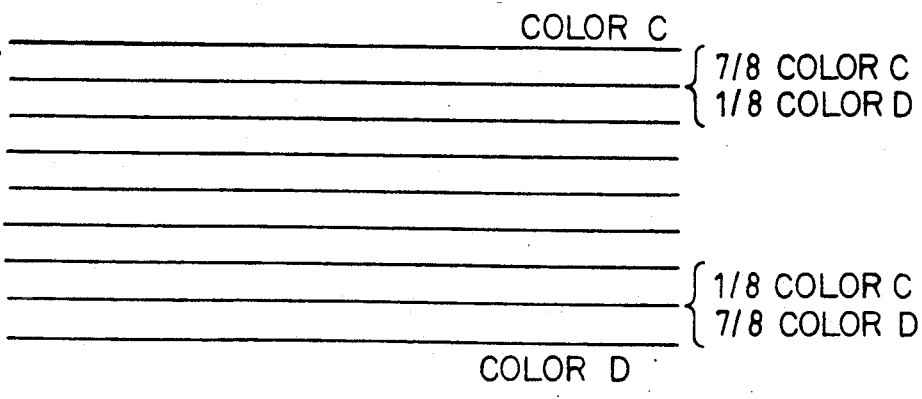
Fig. 6b.

Fig.8a.  EVEN COLOR LEVEL (2)

50% COLOR 2 + 50% COLOR 4

EVEN COLOR LEVEL (4)

Fig.8b.  50% COLOR 4 + 50% COLOR 6 = COLOR 5

75% COLOR 4 + 25% COLOR 6
25% COLOR 3 + 75% COLOR 5

50% COLOR 3 + 50% COLOR 5 = COLOR 4

50% COLOR 2 + 50% COLOR 4 = COLOR 3

50% COLOR 1 + 50% COLOR 3 = COLOR 2

VIDEO SIGNAL PROCESSING WITH ADDED PROBABILISTIC DITHER

This is a continuation of application Ser. No. 118,790, filed Nov. 9, 1987, now abandoned.

BACKGROUND OF THE INVENTION

The invention relates to video signal processing systems including systems for processing television video signals for editing purposes and graphic systems for creating, retouching or editing pictures intended to be displayed, televised or printed. The term video signal processing is intended also to include the transmission of video signals.

Video signal processing systems are often designed to process video signals in digital form. For example, in a color processing system an individual picture point signal, or pixel, may comprise three eight bit binary digital signals representing, say, R.G.B, or Y.U.V, or C.Y.M, components of the pixel. The use of digital video signals facilitates processing and reduces degradation of the information due to noise during the processing. However it limits the number of luminance or color values which can be represented by the processed signals, depending on the number of bits in the digital signals, and in some cases can produce noticable effects which are undesired. This may happen for example if a gradual change in the luminance or color value is represented by the digital signals. The digital signals may step from one value to an adjacent value along a line (not necessarily horizontal) in the picture, and remain constant at the new value over a band in the picture until the next step in value occurs. The change in luminance or color at a step may be small, but nevertheless can be disturbingly perceptible especially if the picture is printed or shown as a still picture on a monitor screen. The steps may have the appearance of contours.

Such effects are particularly undesirable, but unfortunately likely to occur when it is desired to produce a vignetting effect or a so called color wedge on a printed or displayed picture. To produce such an effect, the luminance or color value of the picture is required to change gradually from an initial luminance or color value to an end value over a predetermined distance on the picture. The effect could be produced by specifying two end colors for the wedge, for example dark blue and light blue, and the positions of the beginning and end of the wedge. Signals are generated to produce a line of dark blue at the beginning of the wedge and light blue at the end of the wedge, and lines in between are generated in gradually changing shades of blue with the aid of a computer. Each of the color component signals may be represented by eight bits, allowing only a limited number of shades, with the result that there are distinct changes in color between lines, which can result in a stripy display. The problem can be aggravated in printing, as usually fewer color or luminance steps are available compared with television.

It has been proposed to resolve this problem by adding noise to the digital signals, but the noise tends to cause an unacceptable general deterioration or the picture before the contours or steps are obscured. Furthermore an article entitled "Shaded Computer Graphics in the Entertainment industry" by Franklin C. Crow, University of Texas, published in Computer, March 1978 refers to a 2-D animation system designed at NYIT including an interactive shaded drawing system. An Airbrush can be simulated by scattering random dots of proper color on the image in a probabilistic distribution around a position sent from a data tablet. The problem discussed in the proceeding paragraphs is not touched upon on this article.

U.S. Pat. Nos. 3,739,082, 4,275,411, 4,460,924, 4,568,966 and 4,652,905 describe various systems for dither-quantized signalling for color television. In these systems, the video components are coarsly quantized before transmission to a receiver. To prevent loss of perceptible picture information in consequence of the course quantisation of the signal amplitude and to minimise visible artefacts, suitable ordered dither is first added to the signal before it is quantized. A black and white picture, for example, transmitted by dithered and coarsely quantized signalling is reproduced having a stippled structure such that a shade of gray intermediately between quantum signal levels is approximated by means of a mixture of dots, some lighter and some darker than the required shade. The dither image is a two dimensional ordered dither pattern which has a rectangular array of dither samples repeating horizontally and vertically over the entire television scanning raster, or may be a three dimensional dither pattern which changes between successive frames of the televised moving picture. Color components as well as luminance components may be dithered before quantisation and this results in a pointillistically colored display wherein differently colored specks or patches are intermingled and give the subjective effect of intermediate colors or shades.

BRIEF SUMMARY OF THE INVENTION

One object of the present invention is to provide a video signal processing system in which the value of a characteristic of picture points is conveyed by digital signals and in which the danger of undesired visible effects due to the use of digital signals is substantially reduced.

Another object of the present invention is to provide an effects generator for a graphic system in which a gradual change in luminance or color can be created without undesired visible contours or steps.

Another object of the invention is to provide a graphic method for displaying a gradual change in color intensity or characteristic without undersired contours or steps and without spurious patterns arising from the measures taken to avoid contours or steps.

According to the present invention, there is provided a video signal processing system in which a desired value for a characteristic of individual picture points is provided to an accuracy of m-binary bits or better, and said value in the case of each of said picture points is conveyed by an n-bit binary signal, where (m−n) is an integer greater than one, characterized in that the value of a lower order bit of said binary signal is switched to cause said binary signal to represent, for any one picture point, either a value above or a value below said desired value, said one value or said other value being distributed without order among said picture points and the probability of said one value or said other value being present for any one of said picture points being dependent upon the value of the (m−n) lower order bits of the desired value.

BRIEF DESCRIPTION OF THE DRAWINGS

In the accompanying drawings:

FIGS. 4 and 5 illustrate the effect of using the invention;

FIGS. 6 (a) and 6 (b) illustrate the principles of operation of another graphic system embodying the invention;

FIGS. 8 (a) and 8 (b) illustrate the principles of operation of a modification of the system shown in FIG. 7;

DETAILED DESCRIPTION OF THE INVENTION

Figure 1:
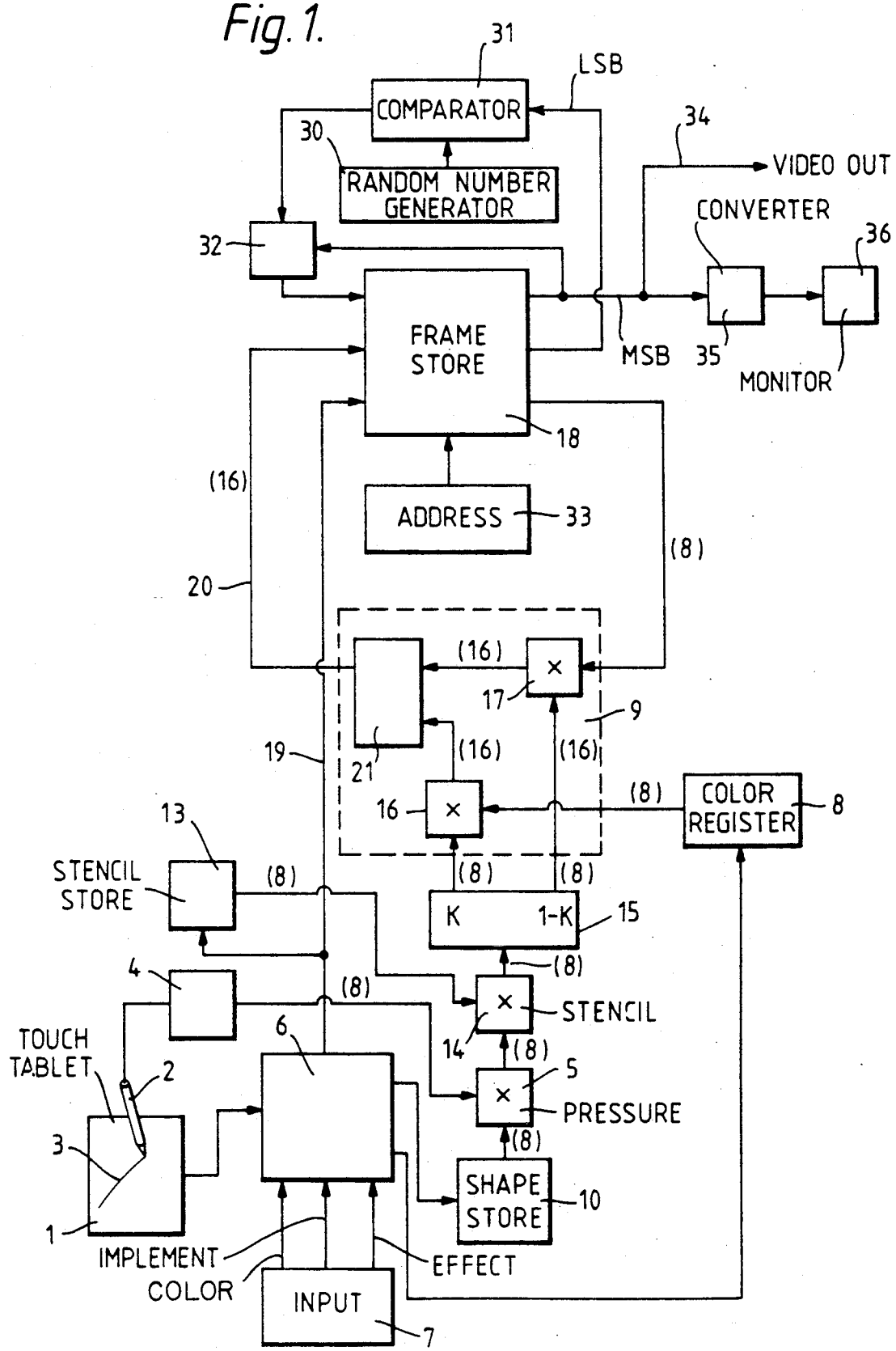
FIG. 1 illustrates a color graphic system embodying the invention.

The system illustrated in FIG. 1 comprises a color graphic system. It includes a touch tablet 1, and a stylus 2 which can be moved on the surface of the tablet by an operator to simulate the movement of a graphic implement, such as a brush, over a canvas or paper. The line 3 on the drawing represents, for example, the stroke of the stylus point on the touch tablet, although the stroke would not normally be visible. The stylus is so constructed that, when manipulated, it generates a signal representing the pressure with which it is applied to the touch tablet and this signal is converted to an eight bit digital signal in a converter 4 and applied as the multiplier to a multiplying circuit 5.

The touch tablet 1 produces signals representing the x and y co-ordinates of successive points on a stroke such as 3, made by moving the stylus over the touch tablet. These signals are applied to a computer 6. Reference 7 represents input means for the computer by which the operator can apply command signals to the computer, representing for example (as indicated on the drawing) the color which he desires to use, his choice of graphic implement, and an effect he desires to produce. The input means 7 provides a choice of graphic implements including say paint brush, pencil, chalk, or air brush. In this system the invention is operative only when air brush is chosen by the operator (though it could also be applied when other implements or effects are selected, if desired) therefore it will be assumed hereafter that input means 7 has been operated to simulate the use of an air brush.

In response to an input from 7 representing a choice of color, the computer 6 selects the appropriate color component signals from a color register 8, which is the form of a RAM. The component signals may be YUV,- CYM or RGB or other sets of signals. The selected color component signals are input to a processor 9 which processes each color component signal separately. However the processor for all color components is similar and the present description will be confined to the operation of the system for one component only. In response to an input signal representing a desired implement the computer applies a signal to a shape RAM 10 to select, for use in the image creation process, a group of signals which define a spatial distribution of drafting medium produced by the selected implement in the vicinity of the point designated, at any particular instant, on the touch tablet 1 by the stylus 2. Various groups of signals for different implements are stored in the RAM 10, but as already indicated it will be assumed that the group for air brush is selected.

Figure 2:
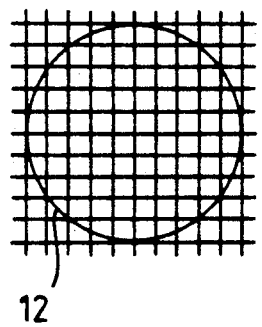
FIGS. 2 and 3 detail the operation of the system shown in FIG. 1.
Figure 3:
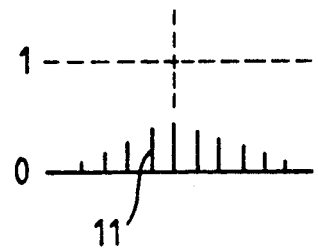

This group may be as represented by FIGS. 2 and 3. In FIG. 2 a matrix of picture points is represented, for which distribution signals are stored whilst FIG. 3 represents the value which the distribution signals might have along a central line of the matrix of picture points. The boundary of the distribution area (the so called brush stamp) for the selected implement is represented by the circle 12, and in the case of the air brush the number of picture points included within the stamp could cover an area greater than that indicated. The distribution signals within the boundary have values between 0 and 1, 1 representing maximum distribution. For air brush the distribution is substantially less than 1 even near the centre of the stamp. Outside the brush stamp boundary the distribution signals are zero. As the computer 6 receives signals from the touch tablet 1, representing a point designated by the stylus 2, the shape RAM 10 is caused to apply the distribution signals successively, for all points in the matrix, to the multiplier 5 which multiplies each distribution signal in turn by the pressure signal from the stylus 2.

As already stated the input means 7 allows the operator to choose from among a group of effects and apply an appropriate signal to the computer 6. One such effect is "stencil" and reference 13 denotes the stencil store which is capable of storing a frame of keying signals representing a stencil. For example the keying signal may have unit value for picture points where the stencil is transparent, zero value where the stencil is opaque, and change gradually in marginal area between there two values. When stencil is selected by the input means, the keying signals representing the stored stencil value from addresses in the store 13 identified by the computer 6 are applied to a multiplier 14 which receives from the multiplier 5 the distribution signals multiplied by the stylus pressure. The output from the multiplier 14, for each picture point in the brush stamp 12, is an eight bit control signal K, representing the distribution signal multiplied by the stylus pressure and by the stencil value.

The control signal K is applied to a complementing circuit 15 and to a further multiplier 16. The output of the complementing circuit, which represents (1−K), is applied to yet another multiplier 17.

The second input to the multiplier 16 comprises the color signals selected from the color register 8 by the computer 6. We now are considering only a representative color component signal, which will be identified as S1. The output of the multiplier 16 for any picture point represents KS1. The second input to the multiplier 17 is the respective color component value S2 read from a picture frame store 18. The particular picture point read from the frame store 18 at any time is determined by the computer 6 in response to the co-ordinate signals from the touch tablet 1. For each point x,y designated by the touch tablet, the computer generates a sequence of addresses, being those of the matrix points represented in FIG. 2, when the brush stamp is located with some reference point at the address x, y. The sequence of addresses generated by the computer 6 is applied to the frame store 18 and also to the stencil store 13 by the read circuit path 19 and any signal stored in the frame store 18 or the stencil store 13 is read out to the multiplier 17 or the multiplier 14 as the case may be. Therefore for every picture point in a brush stamp the multiplier 16 delivers an output KS1, representing an input of a selected color to a picture point selected on the touch tablet. At the same time, the signal S2 from the store 18 representing any color previously applied to the selected picture point, is multiplied by $(1-K)$ in multiplier 17. As shown the output of the two multipliers 16 and 17 are added in an adding circuit 21 and the resultant $KS1+(1-K)S2$ is applied, via a write circuit path 20, to the address in the frame store 18 of the picture point in question.

Therefore the newly selected color is blended at each respective picture point with the old color thereat, under the control of the signal K, which for any picture point is dependent on the distribution signal from 10, the stylus pressure signal form 4 and the stencil signal from 13. By moving the stylus 2 relative to the touch tablet 1, the operator can cause the signals for sequences of brush stamps to be generated and processed.

As so far described, the system illustrated in FIG. 1 is of the same general construction as the graphic systems which are sold under the trade mark PAINTBOX y the applicant/assignee of the present application, and described in, for example, British Patent No. B 2140257 and U.S. Pat. No. 4,633,416.

As represented in the drawings, the signals from the signal sources 4, 8, 10 and 13 are eight bit binary signals and the signals produced by the multipliers 5 and 14 and by the circuit 15 are also limited to eight bit accuracy. However, when air brush is selected, the multipliers 16 and 17 are arranged to deliver their outputs in sixteen bits, so that they can form the product of the two eight bit inputs without rounding off, and the frame store is arranged to be 16 bits deep. (When implements other than air brush are selected, the eight lower significant bit places in the store 18 can be used for other purposes). Moreover, as indicated in FIG. 1, only the eight most significant bits from any picture point addressed by the computer 6, are fed back to the multiplier 17 for combining with a new input. Rounding off in the multipliers 16 and 17 is avoided, when air brush is selected because any one address in the frame store may be accessed many times when processing a stroke such as 3, due to overlapping of successive brush stamps (which are relatively large in the case of the air brush). In addition, a number of passes may be made over the same picture points. Rounding off could therefore result in errors accumulating at various picture points in the frame store 18, which could be significant in relation to the values of the distribution signal and the control signal K which may be quite small for air brush.

Reference 33 denotes a sequential read circuit which reads the picture signals stored in the frame store 18 repeatedly in a suitable raster sequence. The signals so read, which are confined to the eight most-significant bits of the signals in the store even when they are of 16 bits, are applied to utilisation circuit 34, which may be a dot printing circuit or a television transmission channel, and are also applied to a color monitor 36 via a color converting circuit 35. Reading, when effected by the circuit 33, is interleaved with any reading effected during picture creation, and is followed by rewriting. The converting circuit 35 is used to convert the color components if necessary to suit the monitor 36, for example if the color component signals generated by the circuit are CYM whereas the monitor needs RGB signal.

After each selection of air brush, when another implement is selected any sixteen bit picture signals in the store 18 are reduced to eight bit before the new selection becomes effective. To achieve this reduction whilst avoiding the risk of introducing steps or contours due to the coarser quantisation, a dither circuit is added to the system as described. The dither circuit comprises a random number generator 30, which generates 8-bit numbers, a comparator circuit 31 and an adding circuit 32. After use of the air brush the video signals held in the store 18, which will, as stated, be 16 bit signals, are read sequentially in raster format by means of the sequential read circuit 33. The 8 most significant bits MSB which appear in the circuit 34 are applied to an adding circuit 32 and the eight least-significant bits LSB are applied to the comparator circuit 31. In the comparator 31, the LSB are compared with the number which is generated by the random number generator 30 at the relevant time. If the random number is less than or equal to the value of the LSB, 1 is added in the lowest bit place of the MSB by the adding circuit 32. However if the random number is greater than the LSB, no addition is made to the MSB.

The effect of this is to switch the lowest bit of the MSB, without order, to cause the MSB to represent for any one picture point, either a value above or a value below that represented by the original 16 bit video signal. Moreover, the probability of the said one value or the said other value occuring for any one picture point is dependent upon the value of the LSB. Dither is thus added to the MSB to reduce the risk of steps or contours appearing when the display is produced by the MSB. The dither is such that over a substantial number of picture points originally represented by the same 16 bit value, there is a high probability that the colors, though differing slightly, will average visually to the correct value when produced by the dithered MSB. It will be noted that the dithered MSB are written back in the framestore 18 in the appropriate storage locations for future use.

The effect of the dither circuit is illustrated in FIGS. 4 and 5. The figures show three rows each of nine pixels in a patch of the picture after air brushing. The pixels in row 1 of FIG. 4 are shaded to represent that the lowest order bit of the MSB read from the store 18 has value 1, whereas the picture points in rows 2 and 3 are shown blank to represent that this bit has value 0. It is assumed that value represented by the LSB in row one is 0, that in row two is 191/256 and that in row three is 127/256. In FIG. 4, the shading of the pixels is selected to show the step which will be produced in the respective colors or luminance value by discarding the LSB without using the information contained within them. FIG. 5 on the other hand represents the effect of the dither. The number generator 30 generates at random all numbers in the range 0 to 255. At any time when the LSB have the value 191/256, the probability of the random number from the generator 30 being less than or equal to 191 is ¾. On average therefore at 3 out of 4 picture points in row 2, one will be added in the lowest order bit place of the MSB and the respective video signal will become equal to the video signal for the picture points in row 1.

The remaining 1 in 4 picture points in row two will remain at the original values, with the lowest order MSB equal to zero.

Therefore provided that the patch is big enough, the average value of the video signals for row two will approach the correct color value. Similarly for row 3, but in this case an average of 1 in 2 video signals will dither to the value of the video signals in row 1. Due to the use of a random number generator, the dither is positionally random and without order and therefore the risk of dot patterning being created in place of steps or contours is small. As the dither is independent of the positional relationship of the picture points, it is effective for steps or contours of different orientations or curvatures.

Figure 7:
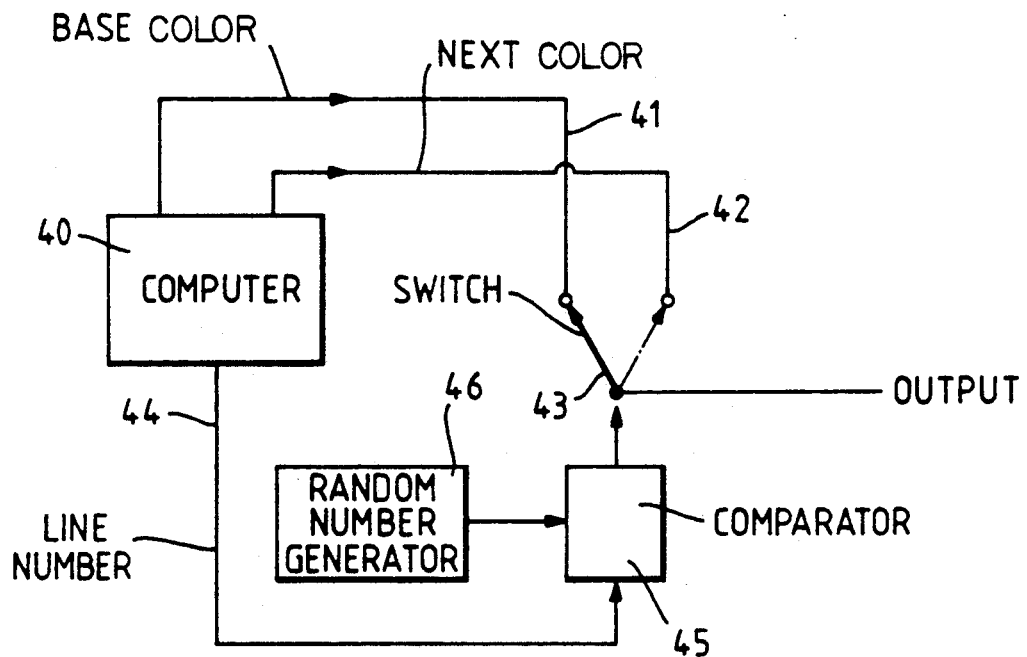
FIG. 7 diagrammatically illustrates said another graphic system which comprises an effects generator.

The inventions can of course be used when other implements, other than brush, are selected and in other forms of video signal processing circuits. For example the invention is useful in video effect generators for producing color wedges in color printing. FIGS. 6 to 8 illustrate such a generator which produces an output for a color printing machine to print a color wedge extending vertically. The electronic signals fed to the printing machine produce signals on the display in the form of an array of dots which vary in area line by line to cause the intensity of the respective color to vary gradually from bottom to top of the wedge. However, due to the fact that the electronic signals at some point are digitised to form say eight bit digital signals, the number of luminance or color values which can be represented by the digital signals for any one picture point is limited and the resolution the printing process is such that a significant number of lines of dots are created between each two adjacent level changes. Consequently the wedge tends to produce unwanted step like changes in luminance or color and these are clearly visible to the human eye in the printed picture.

The color wedge as printed may thus have the appearance represented in a very simplified version of a color wedge as shown in FIG. 6a and 6b. The beginning and end of the wedge are defined as color A and color B. The number of binary bits used for the video signals is such that between these two color there are, say, 256 different color values or levels available each level covering say 8 lines before the step to the next color level. These numbers will of course vary according to the size of the wedge and the beginning and end color. On printing, each color value is determined by selecting dot areas for the printing primaries for the respective line of the wedge.

FIG. 6a shows the effect described above and FIG. 6b shows one step magnified. If we consider the successive color values C and D as shown in FIG. 6b there are 8 lines between the two levels. In prior art systems it was known to change the dot area midway between C and D. In this embodiment of the invention the sharp change between one line of color C signals and one line of color D signals is avoided and intervening lines are produced as a mixture of the two color. The proportions of the mixture are calculated according to the position of the line in the wedge referred to C and D, but the two color signals are mixed randomly along the line. Considering the example above, the line following color C will be made up of, say, ⅞ color C signals and ⅛ color D signals with the pixels of color D being interspersed or distributed randomly along the line. The line immediately before level D will have the proportions ⅞ color D and ⅛ color C signals.

A circuit for achieving this kind of dither is shown in FIG. 7. The beginning and end color in the wedge are predetermined and a computer 40 generates the addresses required. The computer then makes available at inputs 41 and 42 signals representing the start color and first color level thereafter. For the first line the switch 3 selects the start color from input 41 for all dots but the next few lines will be a mixture of the two color in this case the start color which serves as a base color, and the next color level. The computer outputs at 44 a number which corresponds to the proportion of the first color level after the start color which is to make up the line of signals, this number representing the position of the line between the base color and the next color. This will be, say, ⅛th for the first line, ¼ for the second etc. and it remains unchanged during the time taken to produce the line. This number is compared in a comparator 45 with a number between 0 and 1 generated for each picture point in a line in a random number generator 46. When the fixed number generated by the computer is less that the random number generated in generator 46a, switch 43 operates to select the base color signal as the video signal for that picture point signal. If the random number for a picture point is less than the fixed number, the next color level signal will be chosen and so on until a line of signals has been output to the printing machines to a display. For the next line a new fixed number will be compared with the random number from the generator 46. As in FIG. 1 the use of the comparator and random number generator ensures that the correct proportions of the two signals make up one line but that the two signals are distributed randomly along that line.

When the next line to be made up of a single color level signal is reached, the computer operates so that the color signals which were input at 42 become the base level signal at input 41 and the next level signal is input at 42. For this line of single color the fixed number is of course zero. In this form of the invention the number provided by the computer when taken with the different color levels or values provides a desired value for the color to an accuracy exceeding the color levels by themselves.

When the video signals are to be printed at full size, the print scanner scans the signals in the image and taking successive patches of, say, four picture point signals produces dots whose size depends on the average of the video signals for these four picture points. The size of the dot used in printing, for each primary, determines the color at that point in the printed image. Some of the dither will be lost in transferring to print due to averaging but what remains reduces substantially the risk of steps or contours. The range of dot sizes however in printing is smaller than the range of color levels in video graphics and where two succeeding color levels are used as in the first embodiment they may in fact approximate to the same dot size and the desired mixing will be lost. A further embodiment of the invention to overcome this problem is shown in FIG. 8a.

In this embodiment instead of producing intermediate lines from a mixture of two adjacent color levels represented by the video signals, alternate color levels are used. For example as shown in FIG. 8a successive dot signals are equated to even video color levels and odd color levels are produced as a 50/50 mixture of dots representing the two even color levels i.e. level 3 will be a 50/50 mixture of level 4 and level 2. The desired result can be achieved by adjusting the signals at 41, 42 and 44 in the FIG. 7 arrangement.

This can however produce an optical effect whereby the even color level lines having no dither, may look different from the other lines and so as a refinement even color lines may also be produced as a 50/50 mixture of the odd color level signals (FIG. 8b). At some point between two color levels the computer will cause the processing to switch from using two odd color levels to two even color levels. This is achieved in exactly the same way as shown in FIG. 7 but now input 2 is two levels removed from input 1 and the number output by the computer at 44 must of course be appropriate for the desired color mixing, i.e. the reference colors will at first be colors 1 and 3 and then 2 and 4 and so on.

The numbers used in the above explanation are by way of example only and would in fact depend on many factors such as the size of the color wedge and the beginning and end colors. The invention is not limited to the details above.

Figure 9:
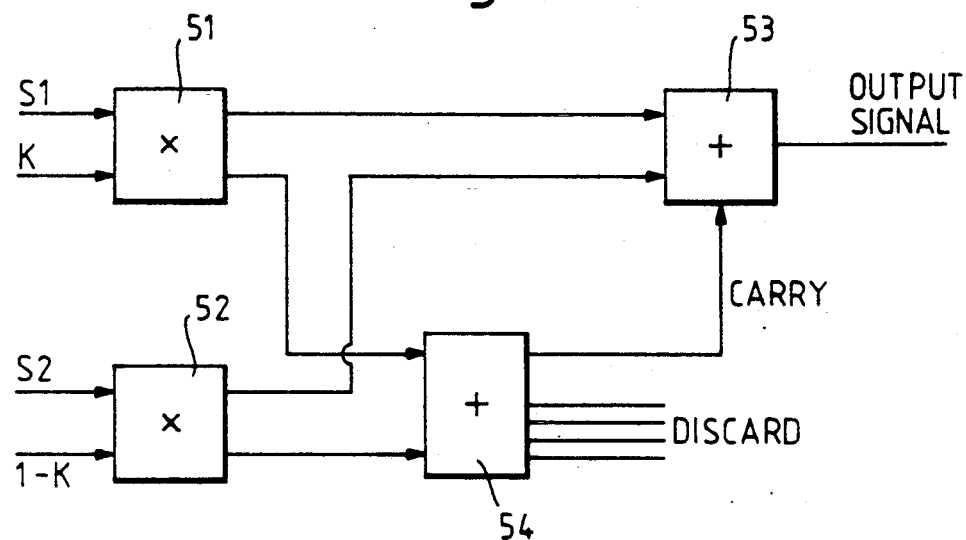
FIG. 9 illustrates a prior art system for combining video signals representing two pictures.
Figure 10:
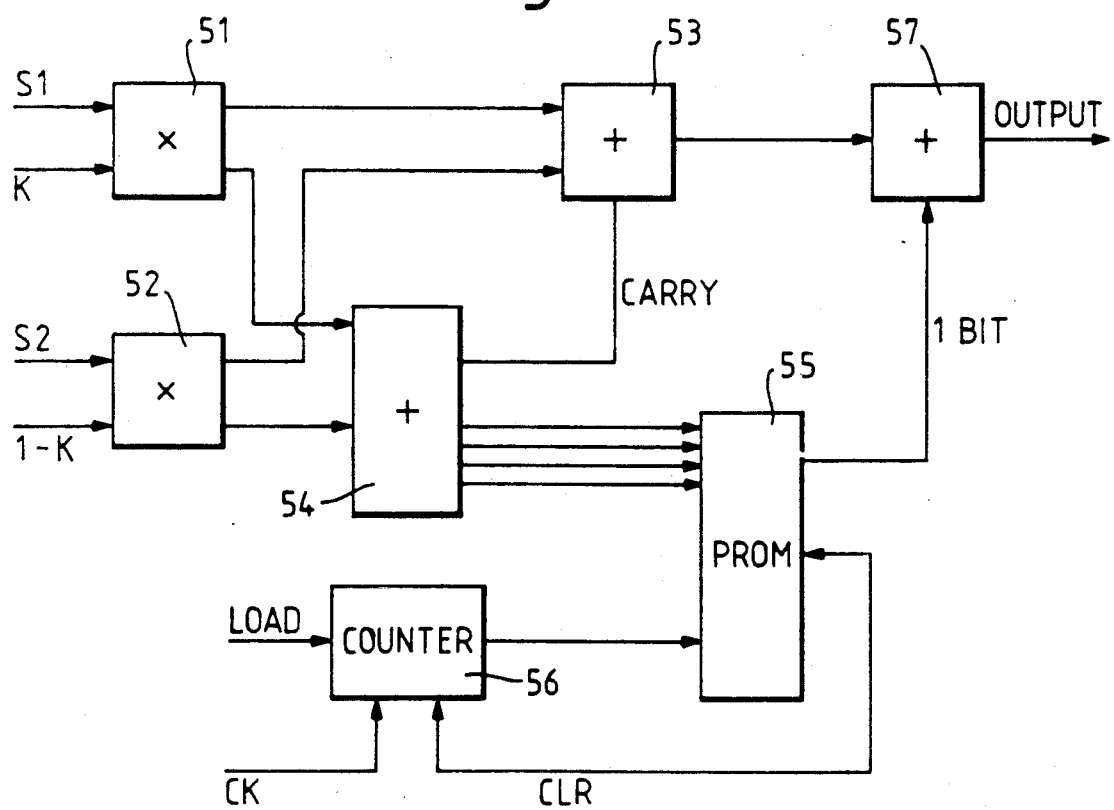
FIG. 10 illustrates the application of the invention to the system illustrated in FIG. 9.

FIG. 9 and 10 illustrate the application of the invention to digital video processing systems where signals from more that one source are combined.

Combined of video signals from different sources is a common occurrence in digital video processing both in video editing systems and in video graphis systems. For example in video editing two pictures may be combined so that a figure from one picture may be superimposed on the background of another picture. Problems occur in this combination due to the digital nature of the signals processed particularly over areas of the picture where the luminances of each source are ramped in opposite directions. In this case the resultant signal should be approximately flat i.e. the 'average' of the two, however the nature of rounding errors means that there will be occasional undesired sharp rises and falls in the output signal and these are visible in the picture.

Considering the prior art system shown in FIG. 9 which shows a circuit for combining two video signals S1 and S2. The video signals are provided as 8 bit digital video signals and the processing is done picture point by picture point. A factor K which is an eight bit digital video keying signal is also provided. The K factor provided depends on the type of processing but in the case of superimposing a figure on a background would be a soft edged key signal. In such a case the value of K would vary linearly over several picture points in the area of the picture where soft edging is required. The picture point signal from the first source is input to multiplier 51 where it is multiplied by K. The corresponding picture point signal from the second source is input to multiplier 52 where it is multiplied by $(1-K)$. The multipliers each produce a 12 bit signal representing the product for each picture point. As the output signal is required to be an 8 bit signal the 8 msb's of the two products are taken to be summed in adder 53 to produce the output signal $KS1+(1-K)S2$. There is obviously some loss of information in this process and to try and overcome this to some extent a second adder 54 is provided. The remaining 4 bits of each product are summed in this adder which produces a 4 bit sum and may also produce a carry bit. The carry bit of the output from 54 is applied to adder 53 and is added to the two products of the multiplier. The information contained in the 4 least significant bits of the products will to some extent be taken into account. Unfortunately this does not solve all the problems associated with the digitized and thus quantized nature of the various signals.

However the problem is reduced by switching the lowest order bit in the output signal from the adder 53 to cause said output signal to assume a value either above or below the desired value represented by the sum of the two outputs from the multipliers 51 and 52. The switching is carried out without order by adding a bit at random to the signal output from 53, the probability that a bit is added at any particular picture print being dependent upon the information contained in the lowest order bits of each product.

In FIG. 10 the components 51 to 54 are the same as in the prior art system of FIG. 9. The processing system according to this embodiment includes additional components which add a bit value randomly with a probability dependent on the values of the four remainder bits from each multiplier 51 and 52 as will be explained later. The weighted random bit value is added to the sum of the video signals and the carry bit, and it reduces the problems with the output signal and produces a smoother looking picture.

As in the FIG. 10 arrangement the first video signal S1 is multiplied in multiplier, 51 by a factor K producing a 12 bit output. Similarly the multiplier 52 produces a 12 bit product $(1-K)S2$. The 4 least significant bits of each product are summed in adder 54 producing a 5 bit signal of which the highest order bit is the carry signal. The carry signal is input to adder 53 as before and the remaining 4 bits are input to PROM 55. This PROM is programmed so that it acts as a series of 128 look up tables. The look up tables (LUT) are programmed so that when taken together all the look up tables contain a random but weighted bit patter, 16 columns wide (corresponding to the 4 bit remainders) and 128 rows long. Each row constitutes one LUT so that row in the bit pattern is selected by the selection of the LUT. The column is selected by the address within the LUT as will be explained.

A counter 56 operates so that each LUT in the PROM 55 is addressed is sequence. When the 4 bit remainder signal relating to the first picture point, for example, is received the counter is at 0 and the first LUT is addressed. The value of the remainder selects the address within the LUT i.e. selects the column. As an example if the four bit remainder signal relating to the picture point 4 has a value 9 the counter selects the fifth LUT i.e. row 5 and the remainder signal addresses the ninth address in the LUT i.e. column 9. The bit pattern is weighted so that when column 9 is addressed there is a 9/16 chance of there being a 1 in that position. Similarly for column 2 there is a $\frac{1}{8}$ chance of addressing a 1 with, however, the 1s being dispersed randomly between the rows. Thus, column 9 contains 72 ones $(9/16 \times 128)$ distributed randomly in the column; similarly column 8 contains 64 ones distributed randomly, and so on. The signal from the address in the PROM selected by the remainder signal is output to adder 57 where it is added to the sum from adder 53. In this way more information from the remainder signals is used. For example if the five bit sum of the two four bit remainder signals is $1\frac{3}{4}$ then the 1 will go as the carry signal to adder 53 and the $\frac{3}{4}$ will select a random bit from the prom with, say, a $\frac{3}{4}$ chance that it will be 1. The output signal from the PROM 55 therefore has a degree of randomness but this is weighted as required to take account of the input signals, so that when added to the output signal from the adder 53, the chance of undesired steps in the picture is reduced. Once the LUT has been addressed by the remainder for one picture point, the counter 56 operates in known manner to increase the count by 1 and select the next LUT. If the counter were to continue cycling through the 128 LUT's (i.e. return at the first LUT after 128) a repeated pattern may be detected in the picture because of the high probability of 128 being a multiple or sub multiple of the number of picture points in the scan line length. A second output of the PROM is provided to be input to counter 56 in order to overcome this problem. This output from the PROM serves to clear the counter when a count of 126 has occurred i.e. when LUT 127 has been reached. Since 127 is prime this is much less likely to be a multiple or sub multiple of the scan line. Similar prime values can be selected for greater or smaller numbers of LUTs. This breaks up any patterns that might occur. The counter 56 is also provided with a load input which allows the operator to force the count to a pre-selected 'illegal' count (say 127) and address a LUT containing say all 0s in order to disable the switching of the lowest order bit from the circuit 53, when the invention is not required during a particular mode of operation.

It is to be understood that the invention is not limited to the embodiments described here to reducing art facts as it has general application in any rounding operation on digital signals. For example it may be applied to rounding from 10 bit video signals provided by some signals provided by some signals to 8 bit video signals according to the CCIR (Central Committee on International Radio, or the French language name for the same organization) recommendation G01. It is possible, to increase the number of LUT's used to select the carry signal and also change the number at which the counter clears. The weighting of the bit pattern could also be changed, relative to the remainder. As an alternative to the comparator/incrementor system for producing dither, an adder alone may be used. For example, referring to FIG. 1, the dithered signals may be produced buy adding the 8 LSB number from the random number generator 30 to the 16 bit video signal from the store 18 and trancating the result to eight MSB. In this case the adder requires protection from over flow.

We claim:

1. A video signal processing system comprising a source providing a desired value for a characteristic of individual picture points to an accuracy of "m" or more binary bits. and a circuit deriving from said value in the case of each of said picture points an n-bit binary signal, where $(m-n)$ is an integer greater than 1, wherein the value of said n-bi binary signal within the range of a lower order bit is switched to cause said n-bit binary signal to represent, for any one picture point, either a value above or a value below said desired value, said one value or said other value being distributed without order among said picture points and the probability of said one value or said other value being present for any one picture point being dependent upon the value of the $(m-n)$ lowest order bits of the desired value.

2. An effects generator for a graphic system comprising: means for generating a line of signals for representing a first color, means for generating a line of signals for representing a second color, and means for generating intervening lines of the signal, said intervening lines separating said lines representing said first color and said second color and each of said intervening lines being generated as signals of only said first color and said second color which are interspersed substantially randomly along the intervening line and are positioned at respective locations along the intervening line.

3. An effects generator for a graphic system comprising: means for defining the colors of several lines of display separated by intervening lines, and means for generating each line in the form of signals representing a defined color or a mixture of two defined colors, including means for generating signals for each of said intervening display lines as signals of a first defined color and signals of a second defined color which are substantially randomly interspersed among the signals of the first defined color, the proportions of the first and second defined colors in a respective intervening line being dependent on the position of the respective intervening display line.

4. A graphic method for displaying a gradual change in a color intensity or characteristic across a band of the image, comprising producing the image in said band by interspersing two different signal elements representing two different values of said intensity or characteristic, said interspersing comprising varying the proportion of the two different signal elements from one line to another in said band gradually depending on the positions of the lines in the band while causing the distribution of the two different signal elements in each line to be substantially random or irregular to avoid or reduce dot patterning.

5. A video signal processing system comprising:
   a first source of digital video signals;
   a second source of digital video signals;
   a source of factor signals K;
   first multiplier means for multiplying a signal from said first source by the factor signal K;
   second multiplier means for multiplying a signal from said second source by $(1-K)$;
   said first and second multiplier means each producing a main product signal and a remainder signal;
   means for summing said remainder signals;
   means for utilizing said summed remainder signals to select a random bit value;
   said selection being weighted in accordance with a probability dependent on the sum of the remainder signals; and
   means for summing said bit value and said main signals to produce an output signal wherein said output signal is utilized for at least temporarily one of displaying, televising, printing or transmitting.

6. A video processing system according to claim 1 in which said circuit comprises a random number generator and a comparator comparing, for each picture point, the value of the $(m-n)$ lower order bits of the desired value with the output of said random number generator, said circuit switching the value of said n-bit binary signal within the value range of a lower order bit depending on whether the value of the $(m-n)$ lower order bits of the desired value is above or below the output of the random number generator.

7. A video signal processing system according to claim 1 in which the value of the $(n-m)$ lower order bits of the desired value for a particular picture point is derived from the position of the respective picture point relative to picture points of a reference color.

8. A graphic method according to claim 4 including the step of utilizing said signal elements to produce printing dots.

9. A system according to claim 1 including look-up table circuits causing the probability of said one value or said other value of said binary signal being present for any one picture point to be established by means of look-up tables.

10. A system according to claim 9, in which a series of look-up tables is provided, one for each of a number of picture points, each look-up table comprising sequence of addresses, at the first of which a signal of value 1 may be found with low probability, at a second of which a signal of value 1 may be found with higher probability and so on for $(m-n)$ addresses.

11. A video signal processing system according to claim 6, in which said circuit derives the value of the $(n-m)$ lower order bits of the desired value for a particular picture point from the position of the respective picture point relative to picture points of a reference color.

12. A system comprising:
 a source of m-bit signals;
 a conversion circuit receiving said m-bit signals from said source and converting each received m-bit signal to a corresponding n-bit signal, wherein:
  (i) the difference (m−n) is a positive integer greater than unity, and
  (ii) the value of an n-bit signal is higher or lower than the value of the m-bit signal corresponding thereto depending on a probability related in value to the value of at least some of the least significant (m−n) bits of said corresponding m-bit signal; and
 a device utilizing said n-bit signal for at least temporarily one of displaying, televising, printing or transmitting.

13. A system as in claim 12, in which said conversion circuit comprises a source of random signals each of which has a value which is substantially randomly selected within a range corresponding to the range of said (m−n) bits, and wherein the value of an n-bit signal is higher or lower than the value of the most significant n bits of the corresponding m-bit signal depending on the value of said least significant (m−n) bits of said corresponding m-bit signal relative to the value of a corresponding one of said random signals.

14. A system as in claim 13, including a random number generator which generates said random signals, a comparator which is coupled to the random number generator to receive said random signals therefrom and to said source to receive therefrom said least significant (m−n) bits of said m-bit signals and to compare each random signal with the least significant (m−n) bits of a corresponding m-bit signal and to generate a single bit which has a value of zero of unity depending on the result of the comparison carried out by said comparator, and an adder receiving the most significant n bits of said corresponding m-bit signal and adding thereto said single bit to thereby generate said corresponding n-bit signal.

15. A system as in claim 14, in which each of said m-bit signals is a signal defining a selected parameter of a picture element of a picture having a resolution of "n" bits per picture element.

16. A system as in claim 15, in which said picture comprises lines each comprising a multiplicity of picture elements, each of said m-bit signals defines a selected parameter of a corresponding picture element to a resolution greater than desired for at least one of displaying said picture and transmitting said picture, and each corresponding n-bit signal defines said parameter of the corresponding picture element to a resolution utilized for at least one of displaying and transmitting said picture.

17. A system as in claim 16, in which said selected parameter is one or more of the parameters selected from the group consisting of the intensity, color and size of a picture element of said picture.

18. A system for generating at least a portion of a color wedge comprising:
 a source of the beginning and end colors of at least one portion of a color wedge, wherein said beginning and end colors are spatially separated by N video lines, where N is an integer greater than unity and each video line comprises a row of pixels;
 a source of proportion signals defining a proportion of said beginning and/or end color for each of said N video lines, said proportion for each of said N lines depending on the position of the respective line;
 a source of random numbers each of which is in a selected range;
 a comparator which compares for each pixel of each of said N lines, a respective one of said random numbers with said proportion signal for the video line of the pixel and generates a comparison result signal;
 a selection circuit which selects for each pixel of each of said N video lines either said beginning color or said end color depending on said comparison result signal, to thereby generate said N video lines such that in each line the relative numbers of pixels in said beginning and end colors are determined by said proportion signals but the beginning and end colors are distributed randomly in the line.

19. A system as in claim 18, in which each of said proportion signals is in the range between zero and unity and each of said random numbers is in a corresponding range.

20. A system as in claim 19, in which said random numbers are in the range of zero to unity.

21. A system comprising:
 a source of a first picture which is defined at least in part by a respective n-bit signal for each picture element and of a second picture which also is defined at least in part by a respective n-bit signal for each picture element;
 a blending circuit which receives corresponding n-bit signals for picture elements of each of the first and second pictures and blends each pair of corresponding n-bit signals to thereby generate m-bit signals defining a selected parameter of a respective blended element of a composite picture, wherein the difference (m−n) is a positive integer greater than unity;
 a conversion circuit which converts each m-bit signal into an n-bit signal having a value determined at least in part upon a probabilistic function depending on information contained in the least significant m−n bits of said m-bit signal.

22. A system as in claim 21 in which said conversion circuit comprises an adder which adds one to the most significant m bits of each n-bit signal for a blended element depending on a probabilistic function of information contained in the least significant n−m bits.

23. A video signal processing system in which a desired value for a characteristic of individual picture points is provided to an accuracy of m or more binary bits, and said value in the case of each of said picture points is conveyed by an n-bit binary signal, where (m−n) is an integer greater than 1, characterized in that the value of said binary signal within the range of a lower order bit is switched to cause said binary signal to represent, for any one picture point, either a value above or a value below said desired value, said one value or said other value being distributed without order among said picture points and the probability of said one value or said other value being present for any one picture point being dependent upon the value of the (m−n) lowest order bits of the desired value, and further characterized in that the probability of said one value or said other value of said binary signal being present for any one picture point is established by means of look-up tables, in which a series of look-up tables is provided, one for each of a number of picture points, each look-up table comprising sequence of addresses, at the first of which a signal of value 1 may be found with low probability, at a second of which a signal of value 1 may be found with higher probability and so on for (m−n) addresses.

24. A system comprising:
   a source of starting signals each represented by "m" bits comprising a most significant bit (MSB) which is followed by (m−1) bits of progressively decreasing significance the last of which is the m-th, least significant bit (LSB);
   a conversion circuit which receives said starting signals and converts each to a corresponding converted signal represented by "n" bits comprising an MSB followed by (n−1) bits of progressively decreasing significance the last of which is an LSB where (m−n)>(+1), and the LSB of each converted signal is determined in part on the basis of a probability related to the values of at least some of the bits following the n-th bit of the corresponding starting signal; and
   a device utilizing said converted signals for at least temporarily one of displaying, televising, printing or transmitting.

25. A method comprising:
   providing starting signals each represented by "m" bits comprising a most significant bit (MSB) which is followed by (m−1) bits;
   converting each of said starting signals to a corresponding converted signal represented by "n" bits comprising an MSB followed by (n−1) bits the last of which is an LSB where (m−n)>(+1), and the LSB of each converted signal is determined in part on the basis of a probability related to at least some of the bits following the n-th bit of the corresponding starting signal; and utilizing said converted signals for at least temporarily one of displaying, televising, printing or transmitting.

* * * * *